United States Patent
Charrier et al.

(10) Patent No.: US 11,231,104 B2
(45) Date of Patent: Jan. 25, 2022

(54) IMPELLER FOR A PLANET CARRIER OF A PLANETARY GEAR SPEED REDUCER OF A TURBOMACHINE

(71) Applicant: SAFRAN TRANSMISSION SYSTEMS, Colombes (FR)

(72) Inventors: Mathieu Jean Charrier, Moissy-Cramayel (FR); Guillaume Julien Beck, Moissy-Cramayel (FR); Jean-Charles Michel Pierre Di Giovanni, Moissy-Cramayel (FR); Alexis Claude Michel Dombek, Moissy-Cramayel (FR); Patrice Jocelyn Francis Gedin, Moissy-Cramayel (FR); Boris Pierre Marcel Morelli, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 89 days.

(21) Appl. No.: 16/500,371

(22) PCT Filed: Apr. 4, 2018

(86) PCT No.: PCT/EP2018/058647
§ 371 (c)(1),
(2) Date: Oct. 2, 2019

(87) PCT Pub. No.: WO2018/185186
PCT Pub. Date: Oct. 11, 2018

(65) Prior Publication Data
US 2021/0116017 A1    Apr. 22, 2021

(30) Foreign Application Priority Data
Apr. 6, 2017 (FR) ........................ 1752991

(51) Int. Cl.
*F16H 57/04*  (2010.01)
*F16H 57/08*  (2006.01)
(Continued)

(52) U.S. Cl.
CPC ....... *F16H 57/0479* (2013.01); *F16H 57/082* (2013.01); *F01D 25/18* (2013.01);
(Continued)

(58) Field of Classification Search
CPC ..... F16H 57/0479; F16H 57/043; F01D 25/18
See application file for complete search history.

(56) References Cited

U.S. PATENT DOCUMENTS

2016/0025208 A1    1/2016  McKinzie
2017/0307061 A1*  10/2017  Gravina .............. F16H 57/0482

FOREIGN PATENT DOCUMENTS

| DE | 102010060147 A1 | 4/2012 |
| EP | 2078888 A1 | 7/2009 |
| FR | 3036763 A1 | 12/2016 |

OTHER PUBLICATIONS

International Search Report received for PCT Patent Application No. PCT/EP2018/058647, dated Jun. 27, 2018, 5 pages (2 pages of English Translation and 3 pages of Original Document).

* cited by examiner

*Primary Examiner* — Derek D Knight
(74) *Attorney, Agent, or Firm* — Womble Bond Dickinson (US) LLP

(57) ABSTRACT

An impeller (130) for a planet carrier of a planetary gear speed reducer of a turbomachine, said impeller having a generally annular shape and comprising means (158) for supporting axes of rotation of planets of said reducer, said impeller comprising means for lubricating teeth of said planets and bearings of said axes, said lubrication means comprising an annular groove (138) located on the internal (Continued)

periphery of said impeller and opening radially towards the inside, said groove being connected to lubricant supply and/or spray means, characterised in that the impeller comprises dynamic annular sealing means (142, 144) located at the inner periphery of said impeller, on either side of the groove, and configured to interact with a stator (132) of the reducer or of the turbomachine intended to extend inside of and coaxially with the impeller.

12 Claims, 3 Drawing Sheets

(51) Int. Cl.
    *F01D 25/18*     (2006.01)
    *F02C 7/06*     (2006.01)

(52) U.S. Cl.
    CPC .......... *F02C 7/06* (2013.01); *F05D 2220/323* (2013.01); *F05D 2260/40311* (2013.01); *F05D 2260/98* (2013.01); *F16H 57/043* (2013.01); *F16H 2057/085* (2013.01)

IMPELLER FOR A PLANET CARRIER OF A PLANETARY GEAR SPEED REDUCER OF A TURBOMACHINE

FIELD OF THE INVENTION

The present invention relates in particular to a spinning wheel for a planet carrier of a planetary gear speed reducer of a turbine engine.

STATE OF THE ART

A planetary gear speed reducer of an aircraft turbine engine conventionally comprises a sun gear coupled to a first shaft and a ring extending around the sun gear. Planets are arranged between the sun gear and the ring and are meshed with them and carried by a planet carrier coupled to a second shaft.

FIG. 1 shows a planet carrier 10 such as described in application FR-A1-3 036 763. This planet carrier 10 comprises a cylindrical body 12 intended to be coupled to the second shaft and connected at a longitudinal end to an annular support wall 14 of parallel axes 16 of rotation of the planets 18. The axes 16 are regularly distributed around the axis A of rotation of the planet carrier and are integral with one of the longitudinal ends thereof of the aforementioned annular wall 14. A spinning wheel 20 is added and fastened to the opposite longitudinal ends thereof and fastened to the latter.

The spinning wheel 20 is integral with the planet carrier 10 due to the connection thereof with the axes 16 of support of the planets 18. The spinning wheel 20 is therefore intended to be put into rotation in operation around the axis A and thus form a rotor of the reducer.

The spinning wheel 20 has a generally annular shape around the axis A and comprises, at the outer periphery thereof, means for supporting axes 16 of rotation of the planets 18. The spinning wheel 20 further comprises means of lubricating bearings mounted between the axes 16 and the planets 18, and of the meshing teeth of the planets 18 and of the sun gear 22. These means for lubricating comprise an annular groove 24 located on the internal periphery of the spinning wheel and opening radially towards the inside.

Injectors for lubricant, carried by a stator of the reducer or of the turbine engine, are arranged radially inside the spinning wheel (they are not shown in FIG. 1), and spray lubricant directly into the groove 24 of the spinning wheel, in order to supply means of supplying and/or of spraying lubricant.

The lubricant is conveyed to the injectors by a pump of a lubrication unit of the turbine engine, which delivers a predetermined flow rate of lubricant to the injectors. With the current technology described above, the lubricant sprayed into the groove is conveyed to the means of supplying and/or of lubricating by centrifugal effect only. However, it is observed in practice that the teeth of the planets and of the sun gear may not be sufficiently supplied with lubricant, which is problematic. This undersupply in oil can be caused by a lack of sufficient energy transmitted to the fluid by the centrifugal effect, or to an unstable distribution of oil in the spinning wheel. A phenomenon of suctioning oil from the bearings can in particular reduce the flow rate of oil supplying the teeth.

It has already been proposed to overcome the problem of oil distribution in the spinning wheel by providing two separate annular grooves at the inner periphery of the spinning wheel, which are supplied independently from one another and respectively supply the means for supplying and/or spraying lubricant of the teeth on the one hand, and axes of the planets on the other hand. However, this type of spinning wheel is complex, expensive to produce, and does not respond to the lack of energy provided to the fluid to reach the teeth.

An existing solution proposes recovering the engine oil pressure by adding two dynamic seals on either side of the annular groove. This solution makes it possible to couple the centrifugal pressure generated by the spinning wheel and the oil pressure supplied by the engine. However, this solution does not make it possible to segregate the oil going to the bearings and the oil going to the teeth. The oil distribution remains unstable in the spinning wheel. The present invention proposes an improvement to these technologies, which provides a simple, effective and economical solution to the problem of lubrication of the teeth of the planets and of the sun gear of a planetary gear reducer.

DISCLOSURE OF THE INVENTION

In accordance with the invention, this objective is achieved with a spinning wheel for a planet carrier of a planetary gear speed reducer of a turbine engine, said spinning wheel being intended to be integral in rotation with said planet carrier and to be set into rotation around an axis A of said reducer, said spinning wheel have a generally annular shape around said axis and comprising means for supporting axes of rotation of planets of said reducer, said spinning wheel comprising means for lubricating teeth of said planets and bearings of said axes, said lubrication means comprising an annular groove located on the internal periphery of said spinning wheel and opening radially towards the inside, said groove being connected to lubricant supply and/or spray means, characterised in that the spinning wheel comprises dynamic annular sealing means located at the inner periphery of said spinning wheel, on either side of said groove, and configured to interact with a stator of the reducer or of the turbine engine intended on the one hand to extend inside the spinning wheel and coaxially to the latter and on the other hand to supply said groove with lubricant.

Contrary to prior art technology, dynamic sealing means are provided between the spinning wheel forming a rotor, and the stator that supplies the spinning wheel with lubricant. By definition, these sealing means are intended to provide a seal between the rotor (spinning wheel) and the stator in operation. This sealing is important such that the flow rate or the pressure of the lubricant supplied by the pump for supplying the stator with lubricant is retained in the means for lubricating the spinning wheel. In addition, the sealing cooperation of the rotor and the stator furthermore makes it possible for the unit to operate as an additional pump that adds to the abovementioned flow rate of the pump the effects of the centrifugal field generated by this additional pump, and thus ensures an optimum lubrication of the teeth of the planets and of the sun gear, and of the bearings of the axes of planets.

The spinning wheel according to the invention can comprise one or more of the following features, taken separately from one another, or in combination with one another:

the spinning wheel is made of two annular portions, respectively radially external and internal, extending substantially around one another, said radially external portion comprising said means for supporting and said radially internal portion comprising said groove and carrying said sealing means;

said radially internal portion comprises substantially radial channels and substantially radial ducts for the passage of lubricant, of which the radially internal ends open into said groove;

said channels and said ducts are regularly distributed around said axis, each one of said channels being arranged between two adjacent ducts and each one of said ducts being arranged between two adjacent channels;

said channels open at the radially external ends thereof onto an external cylindrical surface of said radially internal portion, which is intended to be at least partially covered by said radially external part;

said ducts are in fluidic communication with first longitudinal ends of lubricant nozzles, which are cantilever-mounted at the outer periphery of said radially external portion;

said first longitudinal ends of said nozzles are mounted in cavities of bosses located on said external cylindrical surface of the radially internal portion;

said radially external portion comprises substantially radial arms comprising or carrying at the radially external ends thereof, said means for supporting, said arms are radially aligned with said channels and comprise passages configured to be supplied with lubricant exiting from said channels and extending substantially radially to said means for supporting;

said arms comprise at the radially internal ends thereof, curved wells of which the concavity is oriented radially towards the inside, for the recovery of lubricant exiting from said channels and the conveyance thereof to said passages;

said radially internal ends of said arms are separated by a predetermined radial clearance from said external cylindrical surface in order to ensure a fluidic communication with the outside environment.

The present invention also relates to a planet carrier for a planetary gear speed reducer of a turbine engine, this planet carrier being equipped with an spinning wheel such as described above.

The present invention also relates to a turbine engine comprising a planetary gear speed reducer of which the planet carrier is such as described above.

BRIEF DESCRIPTION OF THE FIGURES

Other features and advantages will emerge from the following description of a non-limiting embodiment of the invention in reference to the appended drawings, wherein.

DETAILED DESCRIPTION OF AN EMBODIMENT OF THE INVENTION

Figure 1:
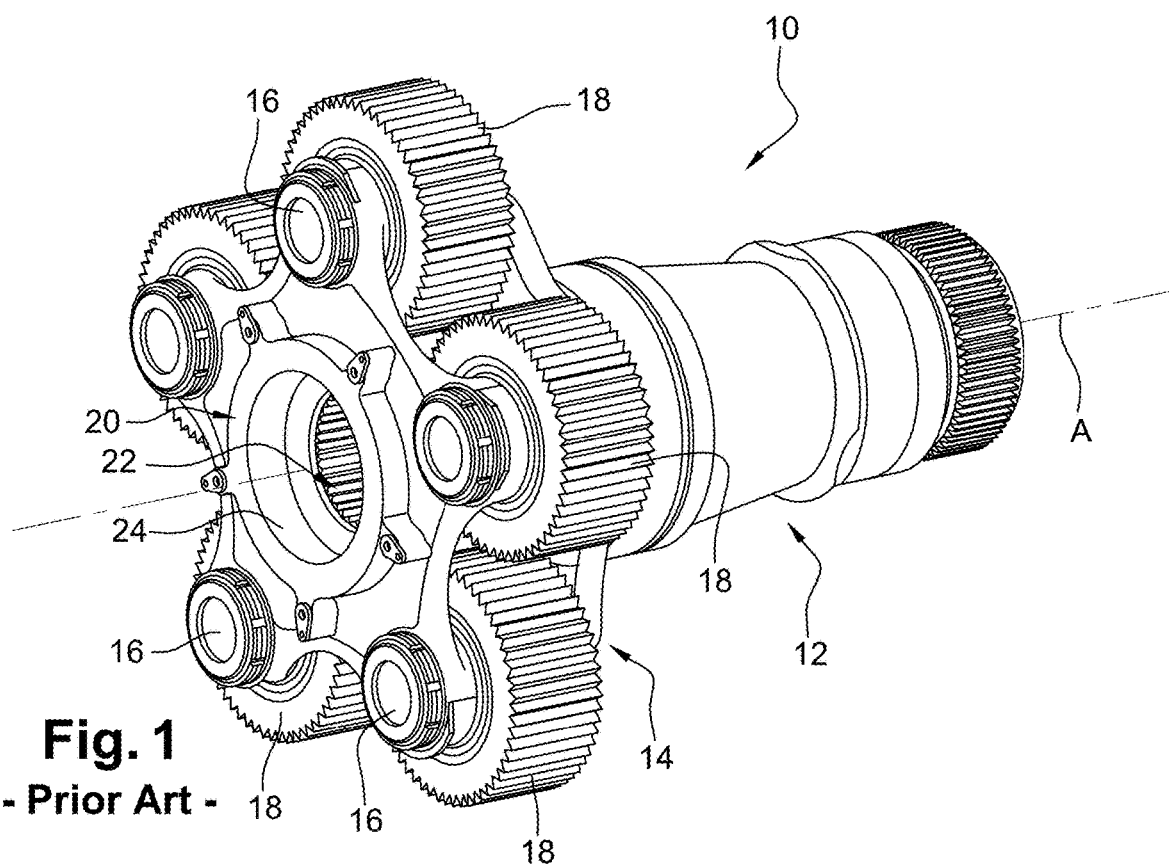
FIG. 1 is a schematic, perspective view of a planet carrier of the prior art.

FIG. 1 has been described above.

The invention relates to the field of planet carriers of a planetary gear speed reducers of a turbine engine, in particular of an aircraft. FIG. 1 and the description above can be used to assess the general and known features of such a reducer and of the planet carrier thereof.

The invention relates more specifically to a spinning wheel for such a planet carrier. A planet carrier spinning wheel is a part that makes it possible in particular to distribute a lubricant, such as oil, in different zones sensitive to a thermal rise and to the dry friction within the reducer. The spinning wheel has two main zones of oil distribution: the meshings or teeth of the sun gear and of the planets and the bearings of the planets.

Figure 2:
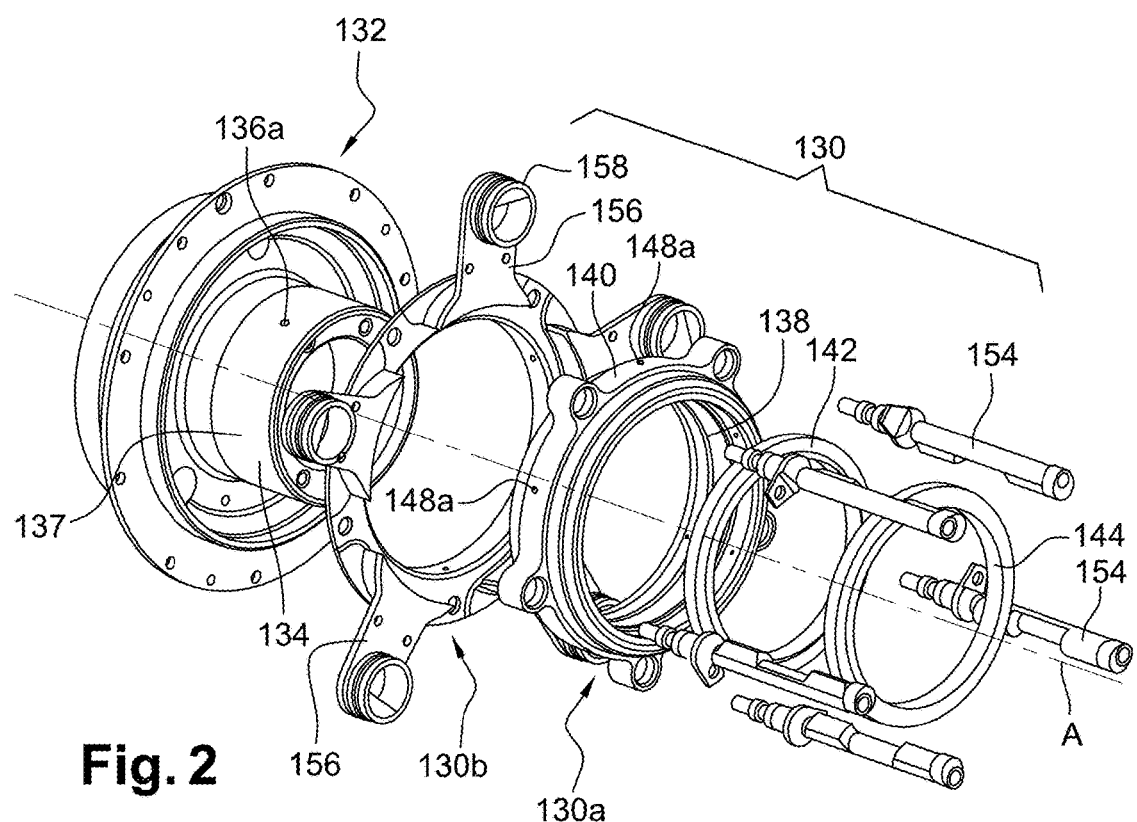
FIG. 2 is an exploded, schematic, perspective view of a stator, of a planet carrier spinning wheel according to the invention, as well as the nozzles thereof.
Figure 3:
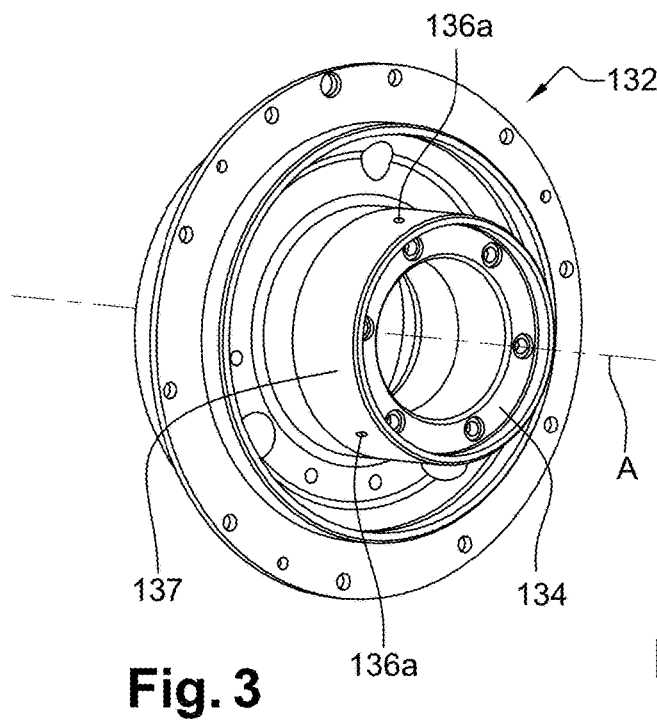
FIG. 3 is a schematic, perspective view of the stator of FIG. 2.
Figure 4:
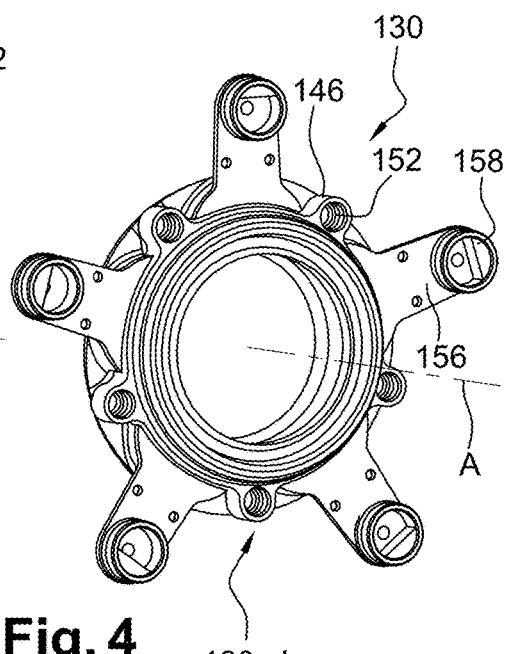
FIG. 4 is a schematic, perspective view of the spinning wheel of the planet carrier of FIG. 2.

FIG. 2 shows a planet carrier spinning wheel 130 according to the invention, which is here associated with a stator 132 which can be a stator of the turbine engine or of the reducer.

Figure 6:
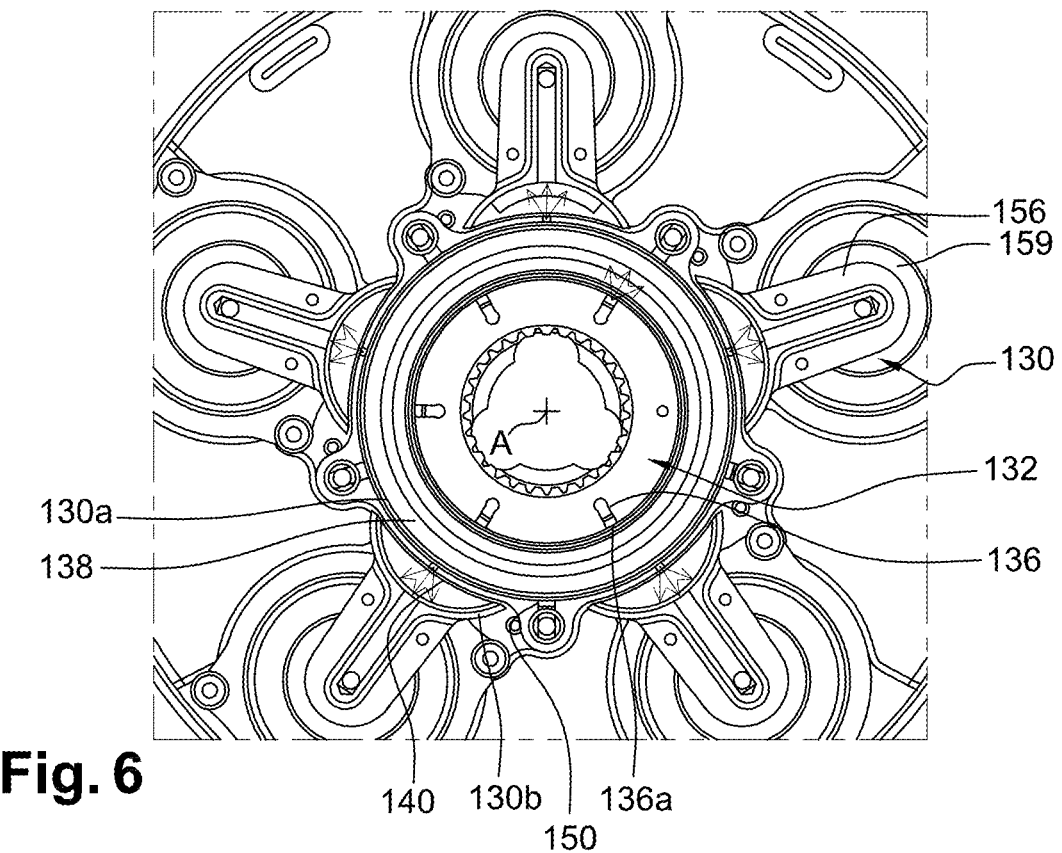
FIG. 6 is a partial, schematic, transverse cross-sectional view of the stator and of the spinning wheel of FIG. 2.
Figure 8:
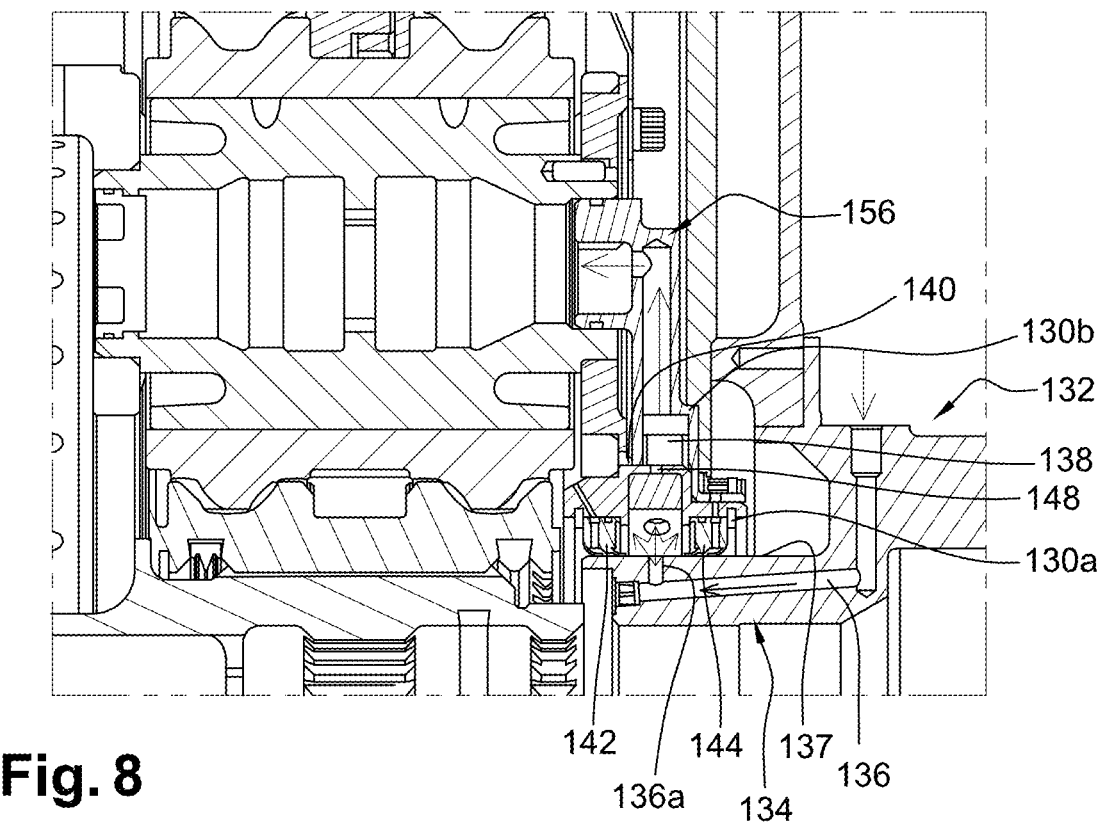
FIG. 8 is a partial, schematic, axial cross-sectional view of the stator and of the spinning wheel of FIG. 2.

The stator 132 can be seen perspectively in FIG. 2, transversely cross-sectionally in FIG. 6 and axially cross-sectionally in FIG. 8. It has a symmetry of revolution about an axis, which the axis A of rotation of the planet carrier and therefore of the spinning wheel 130.

The stator 132 comprises a cylindrical portion 134 that is intended to be surrounded by the spinning wheel 130. As can be seen in FIG. 8, the stator 132 comprises pipes 136 for the circulation of oil that open through orifices 136a onto the external cylindrical surface 137 of the stator 132 for the projection of lubricant radially towards the outside.

The spinning wheel 130 comprises several parts which can be seen in FIG. 2. These parts are integral with each other and intended to be made integral with the planet carrier and therefore driven in rotation about the axis A. They therefore form a rotor that rotates around the abovementioned stator 132.

From among the parts of the spinning wheel 130, it comprises a radially internal portion 130a and a radially external portion 130b which extends around the radially internal portion.

The radially internal portion 130a has an annular shape extending around the axis A. It comprises, at the inner periphery thereof, an annular groove 138 opening radially towards the inside. It comprises, at the outer periphery thereof, an external cylindrical surface 140.

On either side of the groove 138, i.e. upstream and downstream of the groove 138, are arranged dynamic annular seals 142, 144, which are configured to cooperate with the rotor 132.

In the example shown, the radially internal portion 130a comprises a median portion 130aa with a transversal cross-section in the shape of an inverted U. From this median portion 130aa extend respectively upstream and downstream cylindrical edges 130ab for supporting seals 142, 144. The external portion 130b is mounted on the upstream cylindrical edge 130ab of the radially internal portion 130a.

Bosses 146 are situated protruding onto the external cylindrical surface 140 of the portion 130a. Substantially radial channels 148 pass through the portion 130a and extend between the bottom of the groove 138 and the surface 140, for the passage of the lubricant. Substantially radial ducts 150 are furthermore formed in the portion 130a and extend between the bottom of the groove 138 and of the internal cavities 152 of the bosses 146.

The cavities 152 open axially and are intended to receive first longitudinal ends of nozzles 154 of lubricant. Lubricant contained in the groove 138 can, in operation, flow to the channels 148 and to the ducts 150. The ducts 150 supply the cavities 152 and the nozzles 154 with lubricant, which are configured to spray lubricant onto the teeth of the planets and of the sun gear of the reducer.

The channels 148 open by orifices 148a onto the surface 140 of the internal portion 130a. The radially external portion 130b extends around this surface 140.

The radially external portion 130b has an annular shape extending around the axis A. It comprises arms 156 extending substantially radially towards the outside and which comprise, at the radially external ends thereof, means for supporting axes of the planets. These means for supporting each arm 156 comprise for example a cylindrical edge 158 oriented axially and around which is intended to be mounted an axial end 159 (FIG. 6) of an axis of planets.

Figure 5:
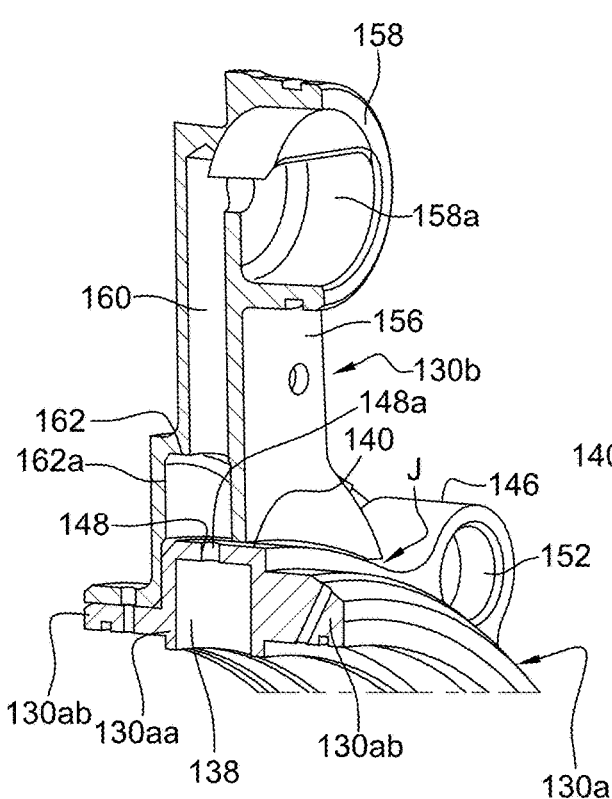
FIG. 5 is a schematic, axial cross-sectional view, and on a larger scale of the spinning wheel of FIG. 4.

The cylindrical edge 158 interiorly defines a chamber 158a that is supplied with lubricant by a substantially radial passage 160 formed in the arm 156 (FIG. 5). This passage 160 therefore communicates at the radially external end thereof with the chamber 158a, and at the radially internal end thereof with a curved-shape cup 162 of which the concavity is oriented radially towards the inside (FIGS. 5 and 7).

In the mounted position of the external portion 130b on the internal portion 130a, the arms 156 are radially aligned with the channels 148 and the orifices 148a of the latter are aligned with the wells 162. The lubricant exiting from the orifices 148a is sprayed towards the wells 162 which, according to the shape thereof, convey the lubricant to the passages 160. The lubricant is then conveyed to the chambers 158a for the purpose of the supplying the axes 159 and the bearings of the planets.

Figure 7:
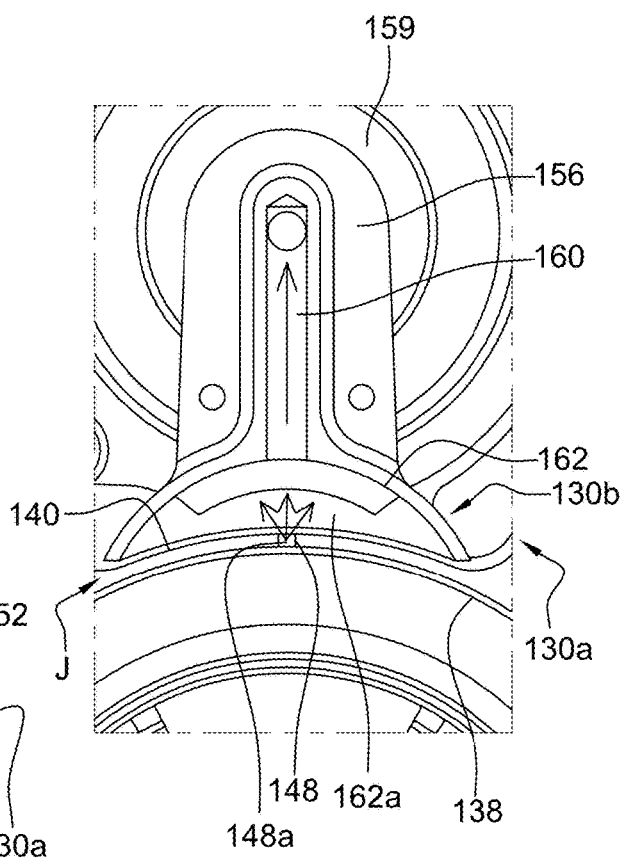
FIG. 7 is a view on larger scale of a detail of FIG. 6.

As can be seen in FIG. 7, the radially internal ends of the arms are radially separated by a predetermined clearance J from the surface 140 of the internal portion 130a. This clearance makes it possible to connect the pockets 162a defined by the wells 162 to the external atmosphere wherein the reducer is situated. This makes it possible to render this lubrication independent from the lubrication of the nozzles 154 which, as has been seen, benefits from the additional pressure generated by the centrifugal fields that are added to the pressure of the pump for supplying lubricant to the pipes 136 of the stator 132.

The invention thus combines the pressure supplied by the supply pump of the reducer with the centrifugal pressure generated by the rotor in order to more easily reach the meshings.

As described above, the lubricant passes through several steps before targeting the loss stations and the stations to be lubricated:
  after having passed through the stator 132, the lubricant arrives in the rotor (spinning wheel 130) by way of the radially directed pipes 136; the lubricant arrives under pressure thanks to the dynamic seals 142, 144 that provide the seal between the rotor and the stator;
  once it has arrived in the rotor, the lubricant is subjected to the centrifugal field; the rotor acts as a pump that is added to the pressure of the lubrication unit to the centrifugal field generated by its own rotation; here, the flow rate of lubricant is distributed between the nozzles for the lubrication of the teeth and the bearings, according to the load losses of the circuits;
  after having passed through the channels 148, the lubricant is returned to atmospheric pressure; the clearance J prevents the phenomenon of surge from affecting the lubrication of the bearings;
  the lubricant going to the bearings is then driven by the centrifugal field of the rotor.

The invention claimed is:

1. A spinning wheel for a planet carrier of a planetary gear speed reducer of a turbine engine, said spinning wheel being integral in rotation with said planet carrier and to be set into rotation around an axis A of rotation of said planet carrier, said spinning wheel having an annular shape around said axis and comprising means for supporting axes of rotation of planets of said reducer, said spinning wheel comprising means for lubricating teeth of said planets and bearings of said axes, said lubrication means comprising an annular groove located on an internal periphery of said spinning wheel and opening radially towards inside said spinning wheel, said groove being connected to lubricant supply and/or spray means, wherein the spinning wheel comprises dynamic annular sealing means located at an inner periphery of said spinning wheel, on either side of said groove, and configured to interact with a stator of the reducer or of the turbine engine.

2. The spinning wheel according to claim 1, said spinning wheel being made of two annular portions, respectively a radially external portion and a radially internal portion, extending partially around one another, said radially external portion comprising said means for supporting and said radially internal portion comprising said groove and carrying said sealing means.

3. The spinning wheel (130) according to claim 2, wherein said radially internal portion comprises channels and ducts for the passage of lubricant, of which radially internal ends open into said groove.

4. The spinning wheel according to claim 3, wherein said channels open at radially external ends thereof onto an external cylindrical surface of said radially internal portion, which is at least partially covered by said radially external part.

5. The spinning wheel according to claim 3, wherein said ducts are in fluidic communication with first longitudinal ends of lubricant nozzles, which are cantilever-mounted at an outer periphery of said radially external portion.

6. The spinning wheel according to claim 2, wherein said radially external portion comprises arms comprising or carrying, at radially external ends thereof, said means for supporting.

7. The spinning wheel according to claim 6, wherein said radially internal portion comprises channels and ducts for the passage of lubricant, of which radially internal ends open into said groove, and said channels open at radially external ends thereof onto an external cylindrical surface of said radially internal portion, which is at least partially covered by said radially external part and said arms are radially aligned with said channels and comprise passages configured to be supplied with lubricant exiting from said channels and extending substantially radially to said means for supporting.

8. The spinning wheel according to claim 7, wherein said arms comprise, at radially internal ends thereof, curved wells of which a concavity is oriented radially towards inside said spinning wheel, for a recovery of lubricant exiting from said channels and a conveyance thereof to said passages.

9. The spinning wheel according to claim 8, wherein said radially internal ends of said arms are separated by a predetermined radial clearance from said external cylindrical surface in order to ensure a fluidic communication with an outside environment.

10. A planet carrier for the planetary gear speed reducer of the turbine engine, wherein it is equipped with the spinning wheel such as defined in claim 1.

11. An aircraft turbine engine comprising the planetary gear speed reducer of which the planet carrier is equipped with the spinning wheel such as defined in claim 1.

12. A spinning wheel according to claim 1, wherein the dynamic sealing means are configured to retain a flow rate or a pressure of the lubricant retained in the means for lubricating.

\* \* \* \* \*